Patented Dec. 15, 1931

1,836,275

UNITED STATES PATENT OFFICE

WILLIAM J. O'BRIEN, OF BALTIMORE, MARYLAND, ASSIGNOR, BY MESNE ASSIGNMENTS, TO KREBS PIGMENT AND COLOR CORPORATION, OF NEWARK, NEW JERSEY, A CORPORATION OF DELAWARE

METHOD OF PRODUCING IMPROVED LITHOPONE

No Drawing.   Application filed February 15, 1928. Serial No. 254,618.

My invention relates to a method of producing an improved lithopone.

As is carried out in the manufacture of titanium oxide and titanium pigments, the ilmenite sands, containing approximately 50 per cent titanium oxide, are treated with sufficient sulphuric acid to extract up to 95 per cent or more, of the titanium oxide present. This extraction is carried on so that the resulting product, after the addition of the required amount of sulphuric acid, is in the form of a dry powdered mass, in which approximately 95 per cent of the titanium is in a soluble form. The dry powdered mass is then extracted in suitable leaching tanks with water, whereby a solution of approximately 70 grams of sulphuric acid and 100 grams of titanium oxide to the liter, is obtained. After settling, the clear solution containing the titanium oxide, is run off and further processed, whereby a product is obtained containing approximately 35 per cent titanium oxide, 2 per cent sulphuric acid and 63 per cent of water. This product is known in the trade as titanium acid cake. It is a plastic mass having somewhat the consistency of mud.

I have discovered that lithopone can be greatly improved by the suitable use of this titanium acid cake, and that the results obtained are dependent to a large extent upon the methods by which this titanium acid cake is used, in the production of lithopone.

For example, I have found that if titanium acid cake is first added to the zinc sulphate solution, and then the lithopone produced in the usual manner, that the resultant product, upon muffling, will form bluish compounds of titanium, which discolor somewhat the final product, and this discoloration is disadvantageous.

I have found that if the acid titanium cake is first slowly added to the barium sulphide solution and rapidly stirred, this discoloration will be avoided in the subsequent steps employed in the manufacture of lithopone.

As an example of the procedure, to make 2000 pounds of titanium lithopone containing 15 per cent titanium oxide, 856 pounds of titanium acid cake, containing 35 per cent titanium oxide and 2 per cent sulphuric acid and 63 per cent water, are slowly added to a solution containing 1050 pounds of barium sulphide, held in a large cylindrical tank, provided with a rotary agitation capable of producing rapid agitation. The mass is thus rapidly agitated, and the 2 per cent of sulphuric acid contained in the titanium acid cake reacts with a small portion of the barium sulphide. This reaction may be represented by the following equation:—

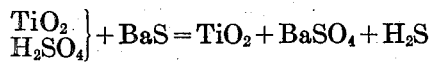

The free sulphuric acid of the titanium acid cake is neutralized by the barium sulphide solution, forming barium sulphate and hydrogen sulphide, as indicated by the above equation. As the sulphuric acid is present only in a small percentage, the major portion of the barium sulphide remains as such.

The titanium oxide is peptized or held in very fine colloidal suspension. The barium sulphate produced is also very fine, and the presence of this very fine barium sulphate in suspension, and also of the very fine colloidal titanium oxide, is believed to be the explanation of the great improvement in the properties of the finished lithopone.

To make up the batch of lithopone the solution containing the original 1050 pounds of barium sulphide and 856 pounds of titanium acid cake is added to sufficient zinc sulphate solution of approximately 35° Baumé at 60° centigrade to completely precipitate all the BaS as zinc sulphide and barium sulphate so that the final precipitate contains a suspension of co-precipitated zinc sulphide barium sulphate intimately mixed with a suspension of titanium oxide. On the completion of the reaction, shown by the complete absence of either soluble zinc or barium in a filtered portion of the precipitate, the mass is filter pressed, dried, muffled and processed in the usual manner for making lithopone.

The lithopone thus obtained shows a marked improvement over other lithopones on the market, in that the covering capacity of the pigment is greatly increased, as well as its fastness to light, and ease of working in oils. It is also superior to the so called double strength lithopone made by doubling the zinc sulphide conent, in that it is very neutral to acid vehicles. It is also far superior to other titanium compounds on the market, inasmuch as greater opacities are obtained with a relatively small amount of titanium oxide, than has heretofore been obtained with far greater proportions of titanium oxide, thereby effecting a considerable economy over that of other similar products containing titanium oxide.

It is to be understood that the form of my invention, herewith described is to be taken as a preferred embodiment of the same, and that various changes may be resorted to in the order of the steps of the method, and that known chemical equivalents may be employed, without departing from the spirit of my invention or the scope of the subjoined claims.

Having thus described my invention, I claim:—

1. In the production of a pigment the steps comprising slowly introducing titanium acid cake into a solution of barium sulphide while subjecting the mass to rapid agitation, mixing the resultant mass with a solution of zinc sulphate and separating the composite precipitate.

2. In the production of a pigment the steps comprising adding titanium acid cake containing titanium oxide and sulphuric acid to a solution containing barium sulphide in excess of the amount required to neutralize the sulphuric acid, while rapidly agitating the solution, mixing the resultant mass with a solution of zinc sulphate, and separating the composite precipitate.

3. In the production of a composite pigment the steps comprising slowly adding titanium oxide to a solution of barium sulphide while rapidly agitating the solution, mixing the resultant mass with a solution of zinc sulphate and separating the composite precipitate.

In testimony whereof I affix my signature.

WILLIAM J. O'BRIEN.